(12) United States Patent
Takamatsu et al.

(10) Patent No.: US 9,035,594 B2
(45) Date of Patent: May 19, 2015

(54) BOOST CONVERTER CONTROL APPARATUS

(75) Inventors: Naoyoshi Takamatsu, Sunto-gun (JP); Masaki Okamura, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 72 days.

(21) Appl. No.: 14/112,139

(22) PCT Filed: Apr. 19, 2011

(86) PCT No.: PCT/JP2011/059651
§ 371 (c)(1),
(2), (4) Date: Oct. 16, 2013

(87) PCT Pub. No.: WO2012/144018
PCT Pub. Date: Oct. 26, 2012

(65) Prior Publication Data
US 2014/0028225 A1 Jan. 30, 2014

(51) Int. Cl.
| | |
|---|---|
| G05B 11/42 | (2006.01) |
| H02P 6/08 | (2006.01) |
| H02P 27/06 | (2006.01) |
| H02P 23/00 | (2006.01) |
| H02M 1/00 | (2006.01) |

(52) U.S. Cl.
CPC ......... H02P 6/08 (2013.01); H02M 2001/0003 (2013.01); H02M 2001/007 (2013.01); H02P 27/06 (2013.01); H02P 2201/09 (2013.01); H02P 23/0004 (2013.01)

(58) Field of Classification Search
CPC ................................ H02M 1/42; Y02B 70/12
USPC ......... 318/609, 610, 621, 622, 623, 629, 632, 318/434, 448, 452, 453, 454, 455, 478, 479, 318/490, 800, 801, 807, 599, 811, 400.01, 318/400.02, 400.14, 400.15
See application file for complete search history.

(56) References Cited

U.S. PATENT DOCUMENTS 7,200,994 B2 * 4/2007 Chertok ......................... 60/518

FOREIGN PATENT DOCUMENTS

| | | |
|---|---|---|
| JP | 09-014265 A | 1/1997 |
| JP | 2004-112904 A | 4/2004 |
| JP | 2006-254518 A | 9/2006 |
| JP | 2010-200534 A | 9/2010 |

* cited by examiner

Primary Examiner — Antony M Paul
(74) Attorney, Agent, or Firm — Sughrue Mion, PLLC

(57) ABSTRACT

A boost converter control apparatus for controlling a motor drive system which is provided with a boost converter disposed between an electric power converter and a direct current power supply, the boost converter boosting a direct current voltage of the direct current power supply and supplying it to the electric power converter, is provided with: an operating device provided with a proportional element, an integral element and a derivative element, the derivative element being configured as a bandpass filter, the operating device calculating a PID controlled variable corresponding to an electric current command value of the boost converter for maintaining an output voltage of the boost converter at a command value of an inter-terminal voltage VH of a smoothing condenser; and a controlling device which is configured to control the output voltage of the boost converter on the basis of the calculated PID controlled variable.

2 Claims, 7 Drawing Sheets

BOOST CONVERTER CONTROL APPARATUS

CROSS REFERENCE TO RELATED APPLICATIONS

This is a National Stage of International Application No. PCT/JP2011/059651 filed Apr. 19, 2011, the contents of all of which are incorporated herein by reference in their entirety.

TECHNICAL FIELD

The present invention relates to a boost converter control apparatus which is configured to control a boost converter in a motor drive system for driving a three-phase alternating current (AC) motor.

BACKGROUND ART

In this type of technical field, an apparatus for reducing a voltage variation has been suggested (e.g. refer to a patent document 1). According to a voltage converting apparatus disclosed in the patent document 1, the voltage variation due to a dead time can be reduced by reducing a carrier frequency of the boost converter when a reactor current of the boost converter has a small absolute value.

PRIOR ART DOCUMENT

Patent Document

Patent document 1: Japanese Patent Application Laid Open No. 2004-112904

DISCLOSURE OF INVENTION

Subject to be Solved by the Invention

An inverter as an electric power converter disposed between the boost converter which is configured to boost a direct current (DC) voltage supplied from a DC power supply and an electric load such as a motor is normally provided with a smoothing condenser for smoothing a voltage. The smoothing condenser becomes more difficult to produce the voltage variation and becomes more stable with increasing its capacity. On the other hand, this large capacity increases its cost and body size. Therefore, in a situation in which there are not a few restrictions in an installation space and cost or the like, such as in the drive control of a vehicle driving motor, reducing the capacity of the smoothing condenser tends to be desired.

On the other hand, if the capacity of the smoothing condenser is reduced, the terminal voltage of the smoothing condenser is likely subject to the voltage variation in a frequency band corresponding to a motor electrical frequency (roughly 0 to several hundred Hz). If switching elements and the like, which constitute the inverter and the smoothing condenser, are electrically protected from the voltage variation, withstand voltages thereof need to be increased; however, the increase in the withstand voltages is also generally associated with the increase in the cost and body size. Therefore, in reducing the capacity of the smoothing condenser, it is necessary to sufficiently suppress the voltage variation in the frequency band corresponding to the motor electrical frequency which occurs in the smoothing condenser.

Here, in order to suppress the voltage variation of the smoothing condenser, it is necessary to appropriately control the input/output current of the DC power supply. In the voltage converting apparatus disclosed in the patent document 1, a voltage control circuit of the smoothing converter is established as a PI control circuit which consists of a proportional element (P) and an integral element (I), and it cannot compensate for a phase delay of 90 degrees which occurs in the smoothing condenser. Thus, the voltage variation of the smoothing condenser cannot be suppressed in real time.

Here, in particular, it is considered that the voltage control circuit of the boost converter is established as a PID control circuit obtained by adding a derivative element (D) to the aforementioned constituents. Since the derivative element has a 90-degree phase lead characteristic, it is possible to preferably suppress the voltage variation in the frequency band corresponding to the motor electrical frequency, due to PID control realized by the PID control circuit.

However, regarding the derivative element, its control term (D term) generally increases as the frequency band increases. The voltage variation which occurs in the terminal voltage of the smoothing condenser is classified broadly into at least two categories; one is the voltage variation in the frequency band corresponding to the motor electrical frequency described above, and the other is a voltage variation (switching ripple) in a frequency band corresponding to a switching frequency (several k to several ten kHz) of the inverter. Therefore, the derivative element follows the switching ripple rather than the voltage variation in the frequency band corresponding to the motor electrical frequency. The frequency band of the switching ripple is in an area beyond the control speed of the input/output current of the DC power supply. If the derivative element follows the switching ripple as described above, the terminal voltage of the smoothing condenser easily becomes unstable.

As described above, an apparatus established under the conventional technical idea, including the apparatus disclosed in the patent document 1, has such a technical problem that it is practically hard to reduce the capacity of the smoothing condenser.

In view of the aforementioned problems, it is therefore an object of the present invention to provide a boost converter control apparatus which is configured to reduce the capacity of a smoothing condenser in an electric power converter without an increase in withstand voltage, in a motor drive system provided with the electric power converter and the boost converter between a DC power supply and an electric load.

Means for Solving the Subject

The above object of the present invention can be achieved by a boost converter control apparatus which is configured to control a boost converter in a motor drive system, said motor drive system comprising: a direct current power supply; a three-phase alternating current motor; an electric power converter disposed between the direct current power supply and the three-phase alternating current motor, the electric power converter including switching circuits, each of which corresponds to respective one of three phases of the three-phase alternating current motor, and a smoothing condenser, which is disposed electrically in parallel with the switching circuits; and the boost converter disposed between the electric power converter and the direct current power supply, the boost converter boosting a direct current voltage of the direct current power supply and supplying it to the electric power converter, said boost converter control apparatus comprising: an operating device comprising a proportional element, an integral element and a derivative element, the derivative element being configured as a bandpass filter, said operating device calculating a PID controlled variable corresponding to an electric current command value of the boost converter for maintaining an output voltage of the boost converter at a command value of an inter-terminal voltage VH of the smoothing condenser; and a controlling device which is configured to control the output voltage of the boost converter on the basis of the calculated PID controlled variable.

The boost converter control apparatus of the present invention means, for example, a computer apparatus, a controller, a processor and the like provided with a memory or the like as occasion demands, and it can be provided with various electrical or magnetic elements and circuits, as occasion demands according to circumstances. Incidentally, the boost converter control apparatus may be an apparatus in which at least one portion thereof may be shared with a control apparatus which is configured to integrally control other elements which constitute the entire motor drive system of the present invention (e.g. the power electric converter and the three-phase alternating current (AC) motor).

According to the boost converter control apparatus of the present invention, by means of the operating device including the proportional element corresponding to a proportional term (P term), the integral element corresponding to an integral term (I term) and the derivative element corresponding to a derivative term (D term), the PID controlled variable is calculated as a controlled variable corresponding to the electric current command value of the boost converter for maintaining or converging an inter-terminal voltage VH of the smoothing condenser at or on the command vale (hereinafter expressed as a "VH command value" as occasion demands).

In other words, the boost converter is driven by PID control as a type of so-called feedback control, under the control of the controlling device of the present invention. Incidentally, a deviation used in carrying out the feedback control is preferably a deviation between the VH command value as a control target, determined in accordance with a target torque and a target rotational speed of the three-phase AC motor, and the inter-terminal voltage VH at that time point.

Incidentally, the boost converter control apparatus of the present invention may be preferably provided with another operating device which is configured to calculate a controlled variable (e.g. a PI controlled variable which consist of the P term and the I term) for maintaining an electric current value of the boost converter at the electric current command value, as a duty signal or the like to be used for a comparison with a carrier signal, on the basis of a deviation between the electric current command value as the PID controlled variable obtained by the controlled variable operation according to this PID control rule and the electric current value of the boost converter at that time point.

Here, the derivative element has a 90-degree phase lead characteristic and it is preferable as an element for compensating for a phase delay of 90 degrees which occurs in the smoothing condenser. In other words, due to the derivative term obtained by the derivative element, it is possible to match the phase of a direct current (DC) carried from the DC power supply in the course of the feedback control and the phase of the electric power of the three-phase AC motor, and it is preferably possible to suppress the voltage variation corresponding to the motor electrical frequency which occurs in the output voltage (inter-terminal voltage VH) of the boost converter. Namely, by virtue of such a technical idea that the PID control is used to control the boost converter, it is not necessary to increase the withstand voltage required for the switching elements of the electric power converter and the smoothing condenser in association with the reduction in the capacity of the smoothing condenser. Moreover, it is also possible to reduce the capacity of the smoothing condenser without an increase in its cost and body size.

By the way, since a differentiator reacts more sensitively on a higher frequency side, the controlled variable (D term) is influenced more significantly by the switching ripple of the electric power converter, which varies in a band on the higher frequency side than the motor electrical frequency (generally whose orders are different by about single digit to double digits). This results in a reduction in the effect of suppressing the voltage variation corresponding to the motor electrical frequency desirably to be suppressed. In addition, the switching ripple of the electric power converter cannot be followed. Thus, it more likely varies the inter terminal voltage VH of the smoothing condenser.

Thus, in the operating device of the present invention, the derivative element is configured not as the normal differentiator but the bandpass filter (BPF). The BPF is a device which is configured to pass signals therethrough in a certain degree of frequency band (which can be variable depending on its design) centered on a cutoff frequency fc, or a device which is configured to amplify signals in accordance with a gain set as occasion demands and passing the signals therethrough.

The adoption of the BPF is derived from the discovery of practically useful facts, which are shown in the following (1) to (3), in the course that the inventors of this application further study the technical field.

(1) The BPF has a 90-degree phase lead characteristic (specifically, the phase leads more, up to 90 degrees, as the frequency decreases) which is substantially equivalent to that of the differentiator, in one portion of a low frequency band on a lower frequency side than the cutoff frequency.

(2) In a high frequency band on the higher frequency side than the cutoff frequency fc, the phase lead characteristic described in (1) is lost, and pass signal intensity also attenuates.

(3) As an alternate element of the differentiator, if the BPF is used as the derivative element, it is possible to efficiently suppress only the voltage variation corresponding to the motor electrical frequency, depending on the design of the cutoff frequency fc. This is derived from the aforementioned (1) and (2) and the significant difference between the frequency band to which the motor electrical frequency for defining the frequency characteristics of the voltage variation desirably to be suppressed belongs and the frequency band to which the switching ripple of the electric power converter desirably not to be followed belongs.

As described above, according to the boost converter control apparatus of the present invention, since the derivative element for calculating the derivative term on the operating device is the BPF, the voltage variation corresponding to the motor electrical frequency can be suppressed, and excessive reaction to the switching ripple of the electric power converter can be also suppressed. As a result, it is possible to stably maintain the inter-terminal voltage VH of the smoothing condenser, thereby realizing the reduction in the capacity of the smoothing condenser without an increase in its cost and body size.

Incidentally, as described above, in order to enable the BPF to effectively function as the derivative element, it is important to design or set the cutoff frequency fc. In terms of the comparison with the differentiator, the setting band of the cutoff frequency fc, which can be clearly superior in efficacy in practice to the differentiator, is broad enough not to require numerical limitation.

However, as a preferred form, the cutoff frequency of the BPF may be set within any of the bands shown in the following (1) to (3).

(1) A band between the physical upper limit of the motor electrical frequency and the physical lower limit of the switching frequency of the electric power converter (which is a relatively broad band as described above).

(2) A band in which a sufficient phase lead amount (e.g. a phase lead amount of "90 degrees−α" or more) is ensured with respect to a desired motor electrical frequency to be certainly suppressed.

(3) A band in which a sufficient signal passage amount (e.g. a signal passage amount of "0−β" dB or more) is ensured with respect to the desired motor electrical frequency to be certainly suppressed.

In one aspect of the boost converter control apparatus of the present invention, the boost converter includes: a reactor whose one end is connected to a positive electrode of the direct current power supply; a first switching element connected between the other end of the reactor and the electric power converter; a second switching element connected between the other end of the reactor and a negative electrode of the direct current power supply; and first and second diodes connected to the first and second switching elements in inverse parallel, respectively.

If the boost converter is configured in this manner, then, due to the control of switching states of the first and second switching elements, it is possible to control the output voltage of the boost converter which is equivalent to the inter-terminal voltage VH of the smoothing condenser, with relatively good controllability. Therefore, it is possible to preferably suppress the voltage variation corresponding to the motor electrical frequency which occurs in the inter-terminal voltage VH of the smoothing condenser.

Incidentally, in the configuration of the boost converter as described above, the electric current command value of the boost converter is a command value (target value) of a reactor current flowing in the reactor.

In one aspect of the boost converter control apparatus of the present invention, a cutoff frequency of the bandpass filter is greater than or equal to an upper limit value of a motor electrical frequency which is proportional to a rotational speed of the three-phase alternating current motor, and the cutoff frequency is less than a lower limit value of a carrier frequency of the electric power converter.

According to this aspect, the cutoff frequency of the BPF is set in a frequency range which is greater than or equal to the upper limit value of the motor electrical frequency and which is less than the lower limit value of the carrier frequency of the electric power converter. Therefore, it is possible to make the derivative element not to follow the switching frequency of the switching circuit, which is influenced by the carrier frequency of the electric power converter (e.g. inverter), while ensuring the sufficient phase lead amount and signal passage amount for the motor electrical frequency. In other words, it is possible to effectively suppress only the voltage variation corresponding to the motor electrical frequency, or to preferentially suppress the voltage variation corresponding to the motor electrical frequency.

Incidentally, the "upper limit value of the motor electrical frequency" in this aspect is not limited to a physical upper limit value which can be adopted by the motor electrical frequency. The motor electrical frequency is proportional to the number of magnetic pole pairs provided for the three-phase AC motor and a motor rotational speed. Therefore, the physical upper limit value of the motor rotational speed can be a type of upper limit value of the motor electrical frequency of this type. In addition, if there is a band of the motor electrical frequency in which it is revealed that the band is to be certainly suppressed, experimentally, experientially, or theoretically in advance, then, a frequency corresponding to the upper limit value of the band can be also the upper limit value of the motor electrical frequency of this type. Moreover, the "band to be certainly suppressed" may be a band corresponding to a relatively low revolution area in which the three-phase AC motor can output relatively high torque, in view of a relation between a drive characteristic of the motor and a voltage variation level of the smoothing condenser.

In another aspect of the boost converter control apparatus of the present invention, said operating device calculates a PI controlled variable in which the derivative element is invalid, instead of the PID controlled variable, if a rotational speed of the three-phase alternating current motor is greater than or equal to a predetermined value, and said controlling device controls the output voltage on the basis of the calculated PI controlled variable.

According to this aspect, if the rotational speed of the three-phase AC motor is greater than or equal to the predetermined value, the PID control in which the BPF is used as the derivative element is changed to the PI control in which the BPF is practically invalid. The change can be realized, for example, by changing a derivative gain to a value corresponding to zero.

Here, the BPF is different from the differentiator, and as the motor electrical frequency moves to the higher frequency side, the phase lead amount further decreases, or the phase is further delayed. The decrease in the phase lead amount, or an increase in a phase delay amount, as described above reduces the variation suppression effect of the inter-terminal voltage VH of the smoothing condenser due to the PID control. In particular, in an area in which the phase is delayed, a role as the derivative element is hardly expected, and in addition, there is such a concern that the voltage variation is further increased. On the other hand, in terms of a relation between the motor rotational speed and a variation level of the inter-terminal voltage of the smoothing condenser, a revolution area of the motor to be significantly suppressed is on the lower frequency side than a rotational speed limit of the motor (e.g. about 3000 rpm) in many cases.

In view of this point, this aspect is extremely useful in practice, and in this aspect, disadvantages which can occur on the higher revolution side can be almost certainly eliminated while preferably suppressing the variation in the inter-terminal voltage VH of the smoothing condenser without any practical problem by changing from the PID control to the PI control if the motor rotational speed is greater than or equal to the predetermined value.

The operation and other advantages of the present invention will become more apparent from embodiments explained below.

MODE FOR CARRYING OUT THE INVENTION

<Embodiments of the Invention>

Hereinafter, various preferred embodiments of the present invention will be explained with reference to the drawings.
<First Embodiment>
<Configuration of Embodiment>

Figure 1:
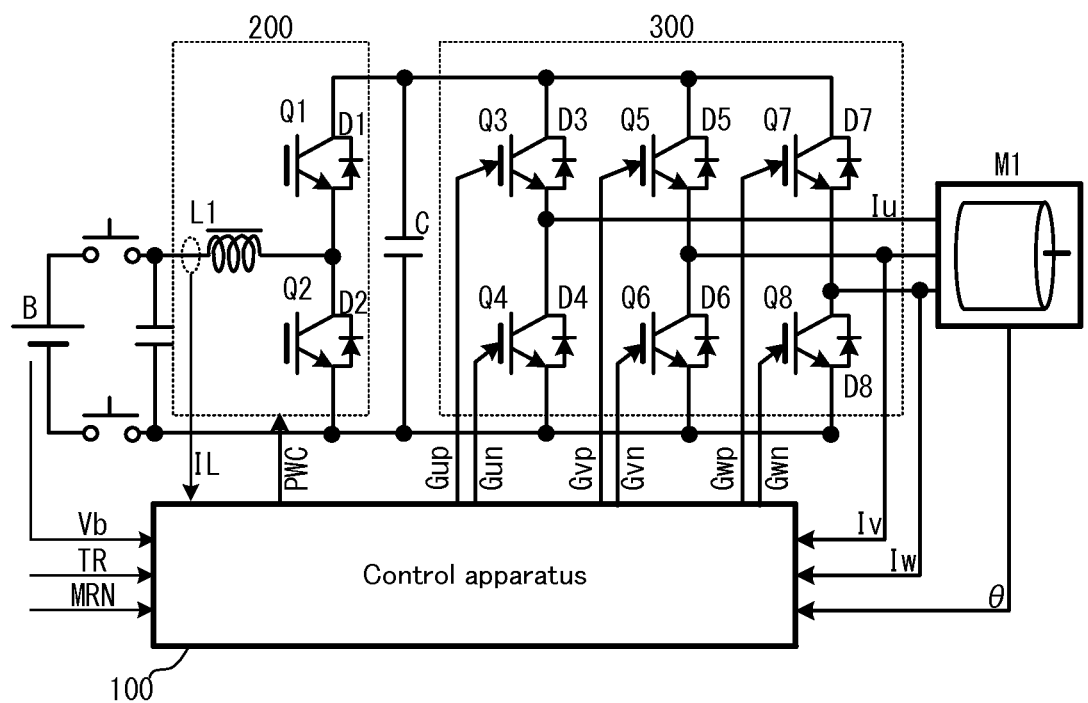
FIG. 1 is a system configuration diagram showing a motor drive system in a first embodiment of the present invention.

Firstly, with reference to FIG. 1, an explanation will be given to the configuration of a motor drive system 10 in the embodiment. FIG. 1 is a system configuration diagram conceptually showing the configuration of the motor drive system 10.

In FIG. 1, the motor drive system 10 is provided with a control apparatus 100, a boost converter 200, an inverter 300, a smoothing condenser C, a direct current (DC) power supply B, and a three-phase alternating current (AC) motor M1.

The control apparatus 100 is configured to control the operation of the motor drive system 10, and it is an electronic control unit as one example of the "boost converter control apparatus" of the present invention. The control apparatus 100 can adopt forms of various computer systems such as various processing units like a single or a plurality of Electronic Control Units (ECUs) or the like, various controllers or microcomputer apparatuses, which can include one or a plurality of Central Processing Units (CPUs), Micro Processing Units (MPUs), various processors or various controllers, or various memory devices such as a Read Only Memory (ROM), a Random Access Memory (RAM), a buffer memory or a flush memory, as occasion demands. The control apparatus 100 is provided, as functional elements thereof, with a boost converter controller 110 and an inverter controller 120, which are not illustrated in FIG. 1. The configuration of each controller will be described later.

The boost converter 200 is provided with a reactor L1, switching elements Q1 and Q2, and diodes D1 and D2, and it is one example of the "boost converter" of the present invention.

One end of the reactor L1 is connected to a positive electrode wire (whose reference numeral is omitted) connected to a positive electrode of the DC power supply B, and the other end is connected to a midway point between the switching element Q1 and the switching element Q2, i.e. a connection point between an emitter terminal of the switching Q1 and a collector terminal of the switching Q2.

The switching elements Q1 and Q2 are connected in series between the positive electrode wire and a negative electrode wire (whose reference numeral is omitted) connected to a negative electrode of the DC power supply B. Moreover, the collector terminal of the switching Q1 is connected to the positive electrode wire, and the emitter terminal of the switching Q2 is connected to the negative electrode wire. The switching elements Q1 and Q2 are one example of the "first switching element" and the "second switching element" of the present invention, respectively. The diodes D1 and D2 are rectifiers for permitting only an electric current flowing from the emitter side to the collector side on the respective switching elements. The diodes D1 and D2 are one example of the "first diode" and the "second diode" of the present invention, respectively. The switching elements Q1 and Q2 and each of switching elements (Q3 to Q8) of the inverter 300 described later are configured, for example, as Insulated Gate Bipolar Transistors (IGBT), power Metal Oxide Semiconductor (MOS) transistors, or the like.

The inverter 300 is provided with: a U-phase arm (whose reference numeral is omitted) including a p-side switching element Q5 and an n-side switching Q6; a V-phase arm (whose reference numeral is omitted) including a p-side switching element Q3 and an n-side switching Q4; and a W-phase arm (whose reference numeral is omitted) including a p-side switching element Q7 and an n-side switching Q8. The inverter 300 is one example of the "electric power converter" of the present invention. The arms of the inverter 300 are connected in parallel between the positive electrode wire and the negative electrode wire. To the switching elements Q3 to Q8, as in the switching elements Q1 and Q2, rectifying diodes D3 to D8 for passing an electric current from the emitter side to the collector side are connected, respectively. Moreover, a midway point between the p-side switching element and the n-side switching element in each phase arm of the inverter 300 is connected to respective one phase coil of the three-phase AC motor M1.

The smoothing condenser C is a condenser for smoothing a voltage which is connected between the positive electrode wire and the negative electrode wire, and it is one example of the "smoothing condenser" of the present invention. The inter-terminal voltage of the smoothing condenser, i.e. the voltage between the positive electrode wire and the negative electrode wire, is one example of the "inter-terminal voltage VH" of the present invention.

The DC power supply B is a chargeable electric storage apparatus, and it is, for example, various secondary batteries such as a nickel-metal hydride battery and a lithium ion battery. Incidentally, as the DC power supply B, in addition to or instead of this type of secondary battery, an electric double layer capacitor, a large-capacity condenser, a flywheel, and the like may be used.

The three-phase AC motor M1 is a three-phase AC motor generator in which a permanent magnet is buried in a rotor. The three-phase AC motor M1 is mechanically connected to a not-illustrated driving wheel of a vehicle, and it is configured to generate a torque for driving the vehicle. The three-phase AC motor M1 can also perform electric power regeneration (power generation) in response to vehicular kinetic energy in braking the vehicular. If this vehicle is a so-called hybrid vehicle, the three-phase AC motor M1 is mechanically coupled with a not-illustrated engine and it can perform the electric power regeneration by using the power of the engine and assist the power of the engine.

In the motor drive system 10, a not-illustrated sensor group is attached so as to detect a voltage Vb of the DC power supply B, a reactor current IL flowing in the reactor L1 of the boost converter 200 (namely equivalent to a battery current Ib as the input/output current of the battery B), an inter-terminal voltage VH of the smoothing condenser C, a v-phase current Iv and a w-phase current Iw of the inverter 300, a motor rotational phase θ, and the like. Each of sensors which constitute the sensor group is electrically connected to the control apparatus 100, and detected values are recognized in real time by the control apparatus 100.

In the motor drive system 10, the boost converter 200 and the inverter 300 are electrically connected to the control apparatus 100, and their drive states are controlled by the control apparatus 100.

Here, in particular, the boost converter 200 can boost the voltage between the positive electrode wire and the negative electrode wire, i.e. the inter-terminal voltage VH, to the output voltage of the DC power supply B or more, on the basis of a signal PWC supplied from the control apparatus 100. At this time, if the inter-terminal voltage VH is less than a VH command value as a target voltage, the on-duty of the switching element Q2 is set to be relatively large, which makes it possible to increase the electric current flowing in the positive electrode wire from the DC power supply B side to the inverter 300 side and to increase the inter-terminal voltage VH. On the other hand, if the inter-terminal voltage VH is greater than the VH command value, the on-duty of the switching element Q1 is set to be relatively large, which makes it possible to increase the electric current flowing in the positive electrode wire from the inverter 300 side to the DC power supply B side and to reduce the inter-terminal voltage VH.

Figure 2:
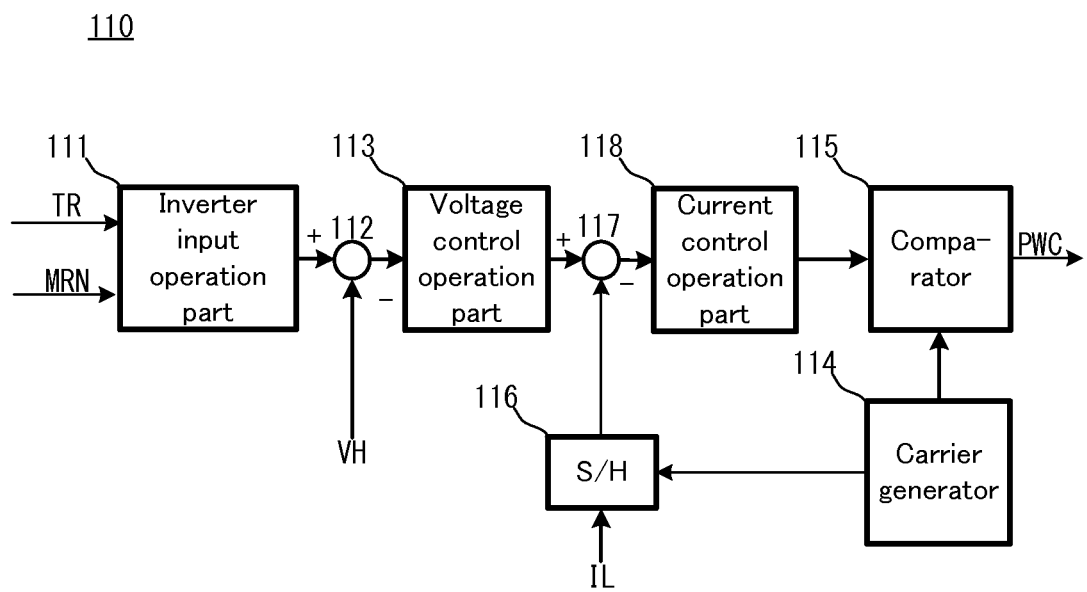
FIG. 2 is a block diagram showing a boost converter controller in a control apparatus provided for the motor drive system in FIG. 1.

Now, with reference to FIG. 2, an explanation will be given to the configuration of the boost converter controller 110 for controlling the boost converter 200 on the control apparatus 100. FIG. 2 is a block diagram showing the boost converter controller 100. Incidentally, in FIG. 2, portions overlapping those of FIG. 1 will carry the same reference numerals, and the explanation thereof will be omitted as occasion demands. Incidentally, in the explanation with reference to FIG. 2 and subsequent FIG. 3, FIG. 4, and FIG. 5, the operations of the embodiment will be also explained in conjunction with the configuration of the embodiment.

In FIG. 2, the boost converter controller 110 is provided with an inverter input operation part 111, an adder-subtractor 112, a voltage control operation part 113, a carrier generator 114, a comparator 115, a sample hold (S/H) circuit 116, an adder-subtractor 117, and a current control operation part 118. Incidentally, the boost converter controller 110 is one example of the "boost converter control apparatus" of the present invention, in a narrow sense.

The inverter input operation part 111 is a circuit for generating a VH command value VHtg indicating the target value of the inter-terminal voltage VH, which is the output voltage of the boost converter 200. For example, the inverter input operation part 111 generates the VH command value VHtg on the basis of the output value of the three-phase AC motor M1 calculated from a motor rotational speed MRN and a torque command value TR of the three-phase AC motor M1.

The adder-subtractor 112 subtracts the detected value of the inter-terminal voltage VH from the VH command value VHtg and outputs the subtraction result (VH deviation) to the voltage control operation part 113.

When receiving the VH deviation as the subtraction result obtained by subtracting the detected value of the inter-terminal voltage VH from the VH command value VHtg, the voltage control operation part 113 calculates an electric current command value IR for matching the inter-terminal voltage VH with the VH command value VHtg on the basis of the VH deviation. The voltage control operation part 113 transmits the calculated electric current command value IR to the adder-subtractor 117. Incidentally, the configuration and operations of the voltage control operation part 113 will be described later.

The carrier generator 114 is a circuit for generating a carrier Car which is a triangular wave having a carrier frequency fcar. The generated carrier Car is transmitted to the comparator 115 and the S/H circuit 116.

The S/H circuit 116 samples and holds the reactor current IL in each timing of the peak and valley (bottom) of the waveform of the carrier Car received from the carrier generator 114.

The adder-subtractor 117 subtracts the detected value of the reactor current IL sampled and held by the S/H circuit 116, from the electric current command value IR transmitted from the voltage control operation part 113. A current deviation as the subtraction result is transmitted to the current control operation part 118.

The current control operation part 118 calculates a controlled variable for matching the reactor current IL with the electric current command value IR on the basis of the current deviation transmitted from the adder-subtractor 117. The current control operation part 118 outputs the calculated controlled variable to the comparator 115 as a duty command value d. Incidentally, the configuration and operations of the current control operation part 118 will be described later.

The comparator 115 compares the magnitude relation of the duty command value d and a carrier signal and generates the aforementioned signal PWC whose logical state varies depending on the magnitude relation. The generated signal PWC is outputted to the switching elements Q1 and Q2 of the boost converter 200 so as to drive each switching element.

Figure 3:
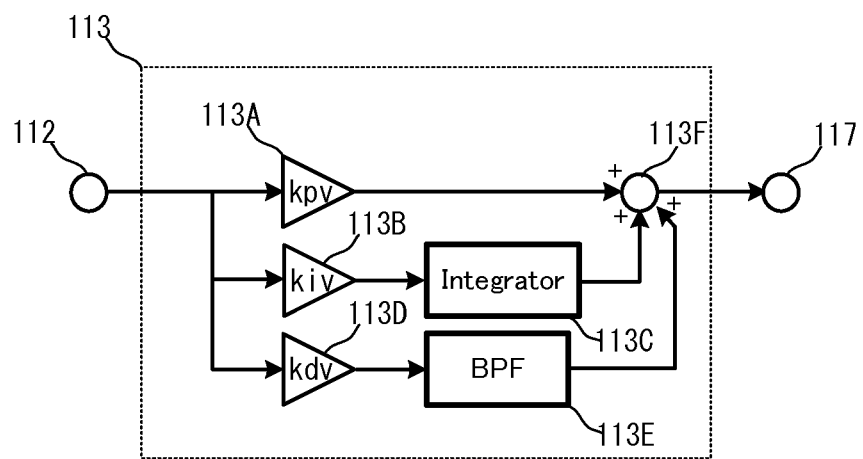
FIG. 3 is a block diagram showing a voltage control operation part in the boost converter controller in FIG. 2.

Next, with reference to FIG. 3, an explanation will be given to the detailed configuration of the voltage control operation part 113 in the boost converter controller exemplified in FIG. 2. FIG. 3 is a block diagram showing the voltage control operation part 113. Incidentally, in FIG. 3, portions overlapping those of FIG. 2 will carry the same reference numerals, and the explanation thereof will be omitted as occasion demands.

In FIG. 3, the voltage control operation part 113 is provided with: a proportional element including an amplifier 113A; an integral element including an amplifier 113B and an integrator 113C; a derivative element including an amplifier 113D and a BPF 113E; and an adder 113F, and it is a processor as one example of the "operating device" of the present invention. On the voltage control operation part 113, a proportional term (P term), an integral term (I term) and a derivative term (D term) are calculated by the respective elements, and the calculated respective control terms are added by the adder 113F. In the end, a PID controlled variable corresponding to the electric current command value IR described above is calculated.

The amplifier 113A is an amplifier associated with the operation of the P term out of the PID controlled variable, and it is configured to amplify the aforementioned VH deviation outputted from the adder-subtractor 112 in accordance with a predetermined proportional gain pv and to transmit it to the adder 113F.

The amplifier 113B is an amplifier associated with the operation of the I term out of the PID controlled variable, and it is configured to amplify the aforementioned VH deviation outputted from the adder-subtractor 112 in accordance with a predetermined integral gain kiv and to transmit it to the integrator 113C. On the integrator 113C, the VH deviation multiplied by the integral gain kiv, which is transmitted from the amplifier 113B, is integrated and then transmitted to the adder 113F.

The amplifier 113C is an amplifier associated with the operation of the D term out of the PID controlled variable, and it is configured to amplify the aforementioned VH deviation outputted from the adder-subtractor 112 in accordance with a predetermined derivative gain kdv and to transmit it to the BPF 113. On the BPF 113E, the VH deviation multiplied by the derivative gain kdv, which is transmitted from the amplifier 113C, is transmitted through the BPF 113E in accordance with its bandpass characteristic and then transmitted to the adder 113F.

On the adder 113F, the respective PID controlled variables of the P term, the I term and the D term supplied from the amplifier 113A, the integrator 113C and the BPF 113E, respectively, are added and outputted to the adder-subtractor 117 as the electric current command value IR, which is the output value of the voltage control operation part 113. The voltage control operation part 113 is configured as described above.

Figure 4:
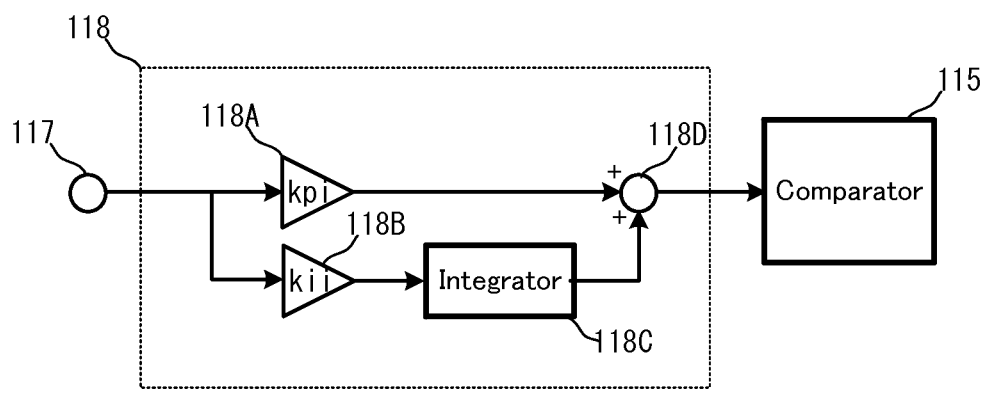
FIG. 4 is a block diagram showing a current control operation part in the boost converter controller in FIG. 2.

Next, with reference to FIG. 4, an explanation will be given to the detailed configuration of the current control operation part 118 in the boost converter controller exemplified in FIG. 2. FIG. 4 is a block diagram showing the current control operation part 118. Incidentally, in FIG. 4, portions overlapping those of FIG. 2 will carry the same reference numerals, and the explanation thereof will be omitted as occasion demands.

In FIG. 4, the current control operation part 118 is a processor provided with: a proportional element including an amplifier 118A; an integral element including an amplifier 118B and an integrator 118C; and an adder 118D. On the current control operation part 118, a proportional term (P term) and an integral term (I term) are calculated by the respective elements, and the calculated respective control terms are added by the adder 118D. In the end, a PI controlled variable corresponding to the duty d described above is calculated.

The amplifier 118A is an amplifier associated with the operation of the P term out of the PI controlled variable, and it is configured to amplify the aforementioned current deviation outputted from the adder-subtractor 117 in accordance with a predetermined proportional gain pi and to transmit it to the adder 118D.

The amplifier 118B is an amplifier associated with the operation of the I term out of the PI controlled variable, and it is configured to amplify the aforementioned current deviation outputted from the adder-subtractor 117 in accordance with a predetermined integral gain kii and to transmit it to the integrator 118C. On the integrator 118C, the current deviation multiplied by the integral gain kii, which is transmitted from the amplifier 118B, is integrated and then transmitted to the adder 118D.

Figure 5:
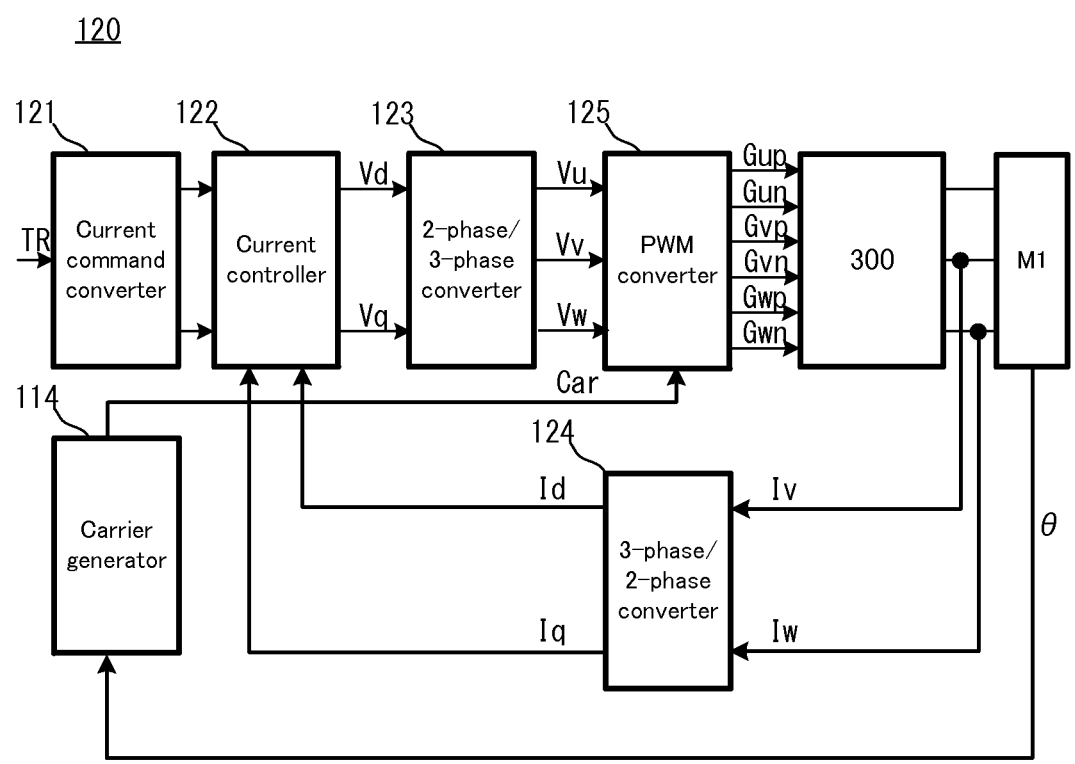
FIG. 5 is a block diagram showing an inverter controller in the control apparatus provided for the motor drive system in FIG. 1.

Next, with reference to FIG. 5, the configuration of the inverter controller 120 will be explained. FIG. 5 is a block diagram showing the inverter controller 120. Incidentally, in FIG. 5, portions overlapping those of the already-described figures will carry the same reference numerals, and the explanation thereof will be omitted as occasion demands.

In FIG. 5, the inverter controller 120 is provided with a current command converter 121, a current controller 122, a 2-phase/3-phase converter 123, a 3-phase/2-phase converter 124, a carrier generator 114 (shared with the boost converter controller 110), and a PWM converter 125.

The current command converter 121 generates 2-phase electric current command values (Idtg, Iqtg) on the basis of the torque command value TR of the three-phase AC motor M1.

On the other hand, from the inverter 300, the v-phase current Iv and the w-phase current Iw are supplied to the 3-phase/2-phase converter 124 as feedback information. On the 3-phase/2-phase converter 124, three-phase electric current values are converted to two-phase electric current values which consist of a d-axis current Id and a q-axis current Iq, on the basis of the v-phase current Iv and the w-phase current Iw. The two-phase electric current values after the conversion are transmitted to the current controller 122.

On the current controller 122, on the basis of a difference between the two-phase electric current command values generated on the current command converter 121 and the two-phase electric current values Id and Iq received from the 3-phase/2-phase converter 124, two-phase voltage command values which consist of a d-axis voltage Vd and a q-axis voltage Vq are generated. The generated two-phase voltage command values Vd and Vq are transmitted to the 2-phase/3-phase converter 123.

On the 2-phase/3-phase converter 123, the two-phase voltage command values Vd and Vq are converted to three-phase voltage command values Vu, Vv and Vw. The converted three-phase voltage command values Vu, Vv and Vw are transmitted to the PWM converter 125.

Here, the PWM converter 125 is configured to receive the carrier Car having the predetermined carrier frequency fear from the carrier generator 114. The PWM converter 125 compares the magnitude relation of the converted three-phase voltage command values Vu, Vv and Vw, generates u-phase switching signals Gup and Gun, v-phase switching signals Gyp and Gvn, and w-phase switching signals Gwp and Gwn, whose logical states change depending on the comparison result, and supply them to the inverter 300.

More specifically, of the switching signals corresponding to each phase, the signal with an identifier of "p" means a drive signal for driving the p-side switching element (Q3, Q5 and Q7) out of the switching elements for each phase, and the signal with an identifier of "n" means a drive signal for driving the n-side switching element (Q4, Q6 and Q8) out of the switching elements for each phase.

Here, in particular, in the comparison of the carrier Car and the voltage command value for each phase, if the voltage command value for each phase matches the carrier Car from a value that is less than the carrier Car, the switching signal for turning on the p-side switching element is generated. Moreover, if the voltage command value for each phase matches the carrier Car from a value that is greater than the carrier Car, the switching signal for turning on the n-side switching element is generated. In other words, in the switching signals, their on and off are inextricably linked to each other, and always either one of the p-side and n-side switching elements for each phase is in the on state and the other is in the off state.

If the inverter 300 is changed to or maintained in the drive state of each of the switching elements defined by the switching signals for each phase, the three-phase AC motor M1 is driven in accordance with a circuit state corresponding to the drive state changed or maintained. Incidentally, such a control aspect of the inverter 300 is one aspect of the so-called PWM control.

<Effect of Embodiment>
<Effect of PID Control of Voltage Control Operation Part 113>

Figure 6:
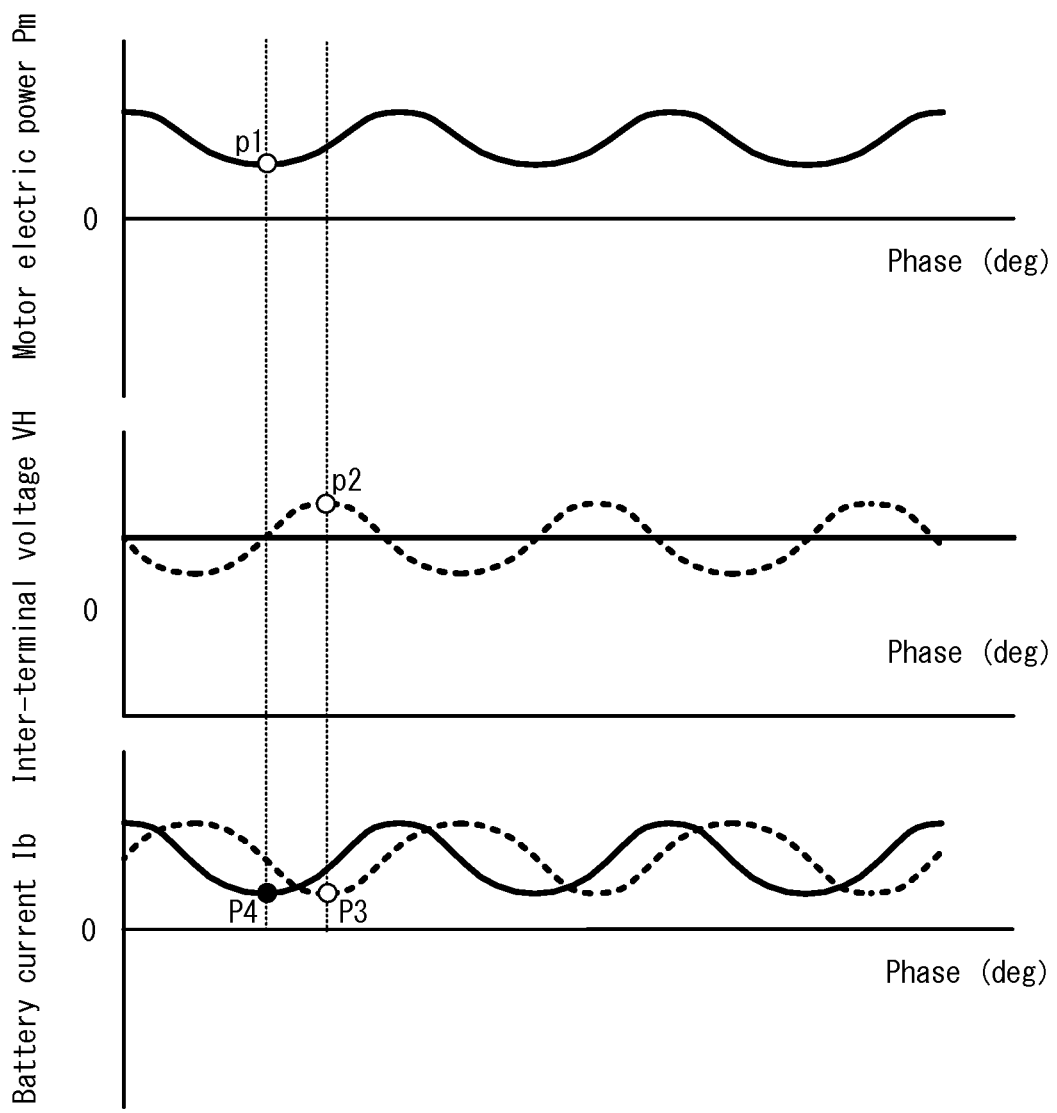
FIG. 6 is a view exemplifying a phase relation among a motor electric power, an inter-terminal voltage and a battery current, associated with the effect of the control apparatus provided for the motor drive system in FIG. 1.

Next, with reference to FIG. 6, as the effect of the embodiment, the effect of the PID control will be explained. FIG. 6 is a view explaining a phase relation among a motor electric power Pm which is the output power of the three-phase AC motor M1, the inter-terminal voltage VH which is the inter-terminal voltage of the smoothing condenser C, and a battery current Ib which is the output current of the battery B.

In FIG. 6, dashed lines associated with the phase characteristics of the inter-terminal voltage VH and the battery current Ib indicate characteristics in a case where the voltage control operation part 113 performs not the PID control but PI control.

As is clear from FIG. 6, if the motor electric power Pm is a white circle p1 illustrated, in the PI control, the inter-terminal voltage VH is influenced by a phase delay of 90 degrees in the smoothing condenser C until the effect of the white circle p1 appears in the inter-terminal voltage VH. Therefore, the effect of the white circle p1 appears in the inter-terminal voltage VH as a white circle p2 illustrated. The battery current Ib determined by feeding back the inter-terminal voltage VH is also influenced by the phase delay in the smoothing condenser C, and it undergoes a transition in a reverse-phase relation with respect to the inter-terminal voltage VH as in a white circle p3 illustrated on the dashed line. As a result, the waveform of the battery current Ib does not match the actual waveform of the motor electric power Pm and cannot suppress a variation in the inter-terminal voltage VH corresponding to a motor electrical frequency fmt. Inevitably, the withstand voltage of each switching element of the inverter 300 and the smoothing condenser C is required extra at least by the variation range of the inter-terminal voltage VH, and thus, an increase in cost and body size is unavoidable.

In contrast, if the PID control is performed instead of the PI control, the phase lead characteristic of the derivative element makes it possible to match the phase of the battery current Ib and the phase of the motor electric power Pm on a time axis. This is indicated by solid lines. For example, for the power point of the illustrated white circle p1 described above, the battery current Ib has a value of a black circle p4 illustrated. As a result, the waveform of the inter-terminal voltage VH ideally does not have the voltage variation corresponding to the motor electrical frequency, as indicated by the solid line.

Incidentally, the motor electrical frequency fmt is a value obtained by multiplying the inverse of the motor rotational speed per second by the number of magnet pole pairs of the three-phase AC motor M1. For example, in the case of a three-phase AC motor having four magnet pole pairs, the motor electrical frequency at 3000 rpm (i.e. 50 revolutions per second) is 50×4=200 (Hz).

<Effect of BPF in Voltage Control Operation Part 113>

Figure 7:
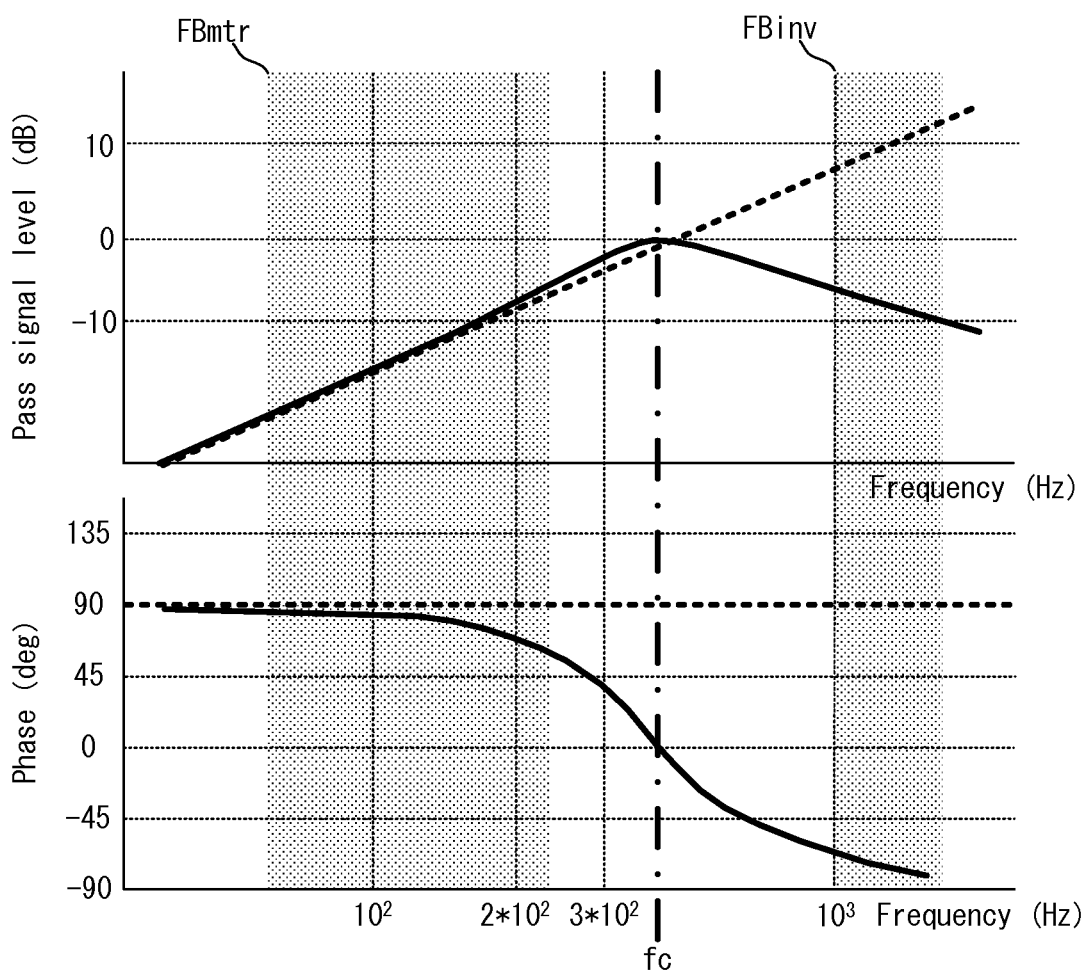
FIG. 7 is a schematic Bode diagram associated with the effect of the control apparatus provided for the motor drive system in FIG. 1.

Next, with reference to FIG. 7, as the effect of the embodiment, the effect of the BPF 113E will be explained. FIG. 7 is a schematic Bode diagram conceptually showing the characteristics of the BPF 113E.

In FIG. 7, the upper portion indicates the frequency characteristic of a pass signal level of the derivative element of the voltage control operation part 113 and the lower portion indicates the frequency characteristic of a phase of the same. Thick dashed lines indicate the characteristics in a case where a general differentiator is adopted as the derivative element and indicate a comparative example to be used for the comparison with the embodiment.

If the differentiator is used as the derivative element, the phase of a pass signal is advanced by 90 degrees without depending on the frequency of an input signal. Therefore, in terms of the phase, the differentiator is useful as the derivative element. However, as shown in the upper portion, the pass signal level of the differentiator linearly increases on the Bode diagram with respect to the frequency of the input signal. Therefore, if the inter-terminal voltage VH includes a signal with a higher frequency than the motor electrical frequency, the D term of the PID control is significantly influenced by the high-frequency side signal.

Here, the carrier frequency fcar of the carrier Car supplied from the carrier generator 114 described above is higher than the motor electrical frequency fmt, and the switching frequency of each of the switching elements which constitute the inverter 300 roughly belongs to a high frequency area of several k to several ten kHz. Therefore, if the differentiator is used as the derivative element, the differentiator follows the voltage variation corresponding to the switching frequency of the inverter 300 rather than the voltage variation. Thus, not only that the voltage variation corresponding to the motor electrical frequency cannot be effectively suppressed, but also the inter-terminal voltage VH of the smoothing condenser C likely becomes unstable.

In contrast, what are indicated by illustrated thick solid lines are the frequency characteristics in a case where the BPF 113E is used as the derivative element.

If the BPF 113E is used, the pass signal level almost matches a pass signal level in the case of the differentiator on a lower frequency side than a cutoff frequency fc indicated by an illustrated alternate long and short dash line, and the pass signal level attenuates due to a bandpass effect on a higher frequency side than the cutoff frequency fc. On the other hand, in view of the phase of the pass signal, the phase lead characteristic which almost matches a phase lead characteristic in the case of the differentiator is seen on the lower frequency side than the cutoff frequency fc. In particular, as the frequency decreases, a phase lead amount gradually approaches 90 degrees.

In other words, in a frequency band on the lower frequency side than the cutoff frequency fc, the BPF 113E has substantially equivalent efficacy to that of the differentiator. In addition, due to the signal attenuation effect on the higher frequency side than the cutoff frequency fc, as opposed to the differentiator, the derivative element does not act on the voltage variation corresponding to the switching frequency of the inverter 300. Thus, it is possible to suppress the voltage variation corresponding to the motor electrical frequency, selectively and certainly.

Incidentally, the phase lead amount of the pass signal is zero at the cutoff frequency fc, and the pass signal is delayed from the input signal on the higher frequency side than the cutoff frequency fc. However, if the frequency band that can be adopted by the motor electrical frequency fmt is set as an illustrated band FBmtr (refer to a hatching area) and if the frequency band that can be adopted by the switching frequency of the inverter 300 is set as an illustrated band FBinv (refer to a hatching area), there is a great difference between the bands. As long as the cutoff frequency fc is accurately set, an area in which the phase lead amount decreases and a subsequent area in which the phase delays do not significantly overlap the band FBmtr. Moreover, the accurate setting of the cutoff frequency fc is at least not difficult in view of the difference between the bands.

In particular, in the embodiment, the cutoff frequency fc of the BPF 113E is located between the bands on the Bode diagram (on the higher frequency side than the upper limit of a range that can be adopted realistically by the motor electrical frequency fmt, and on the lower frequency side than the lower limit (simply, the carrier frequency fcar) of a range that can be adopted realistically by the switching frequency of the inverter 300). Thus, in the band FBmtr, the voltage variation corresponding to the motor electrical frequency in the smoothing condenser C can be suppressed generally well. Of course, an aspect of setting the cutoff frequency fc has a relatively large acceptable range. For example, it may be set on the higher frequency side than the illustrated cutoff frequency fc so as to ensure a phase lead amount of (90−α) degrees (α is arbitrary, e.g. about 10 degrees) in the illustrated band FBmtr corresponding to the motor electrical frequency. On the other hand, it may be set on the lower frequency side than the illustrated cutoff frequency fc so as to certainly attenuate the signal (e.g. to ensure an attenuation amount of −10 dB) in the illustrated band FBinv corresponding to the switching frequency of the inverter 300.

<Second Embodiment>

Figure 8:
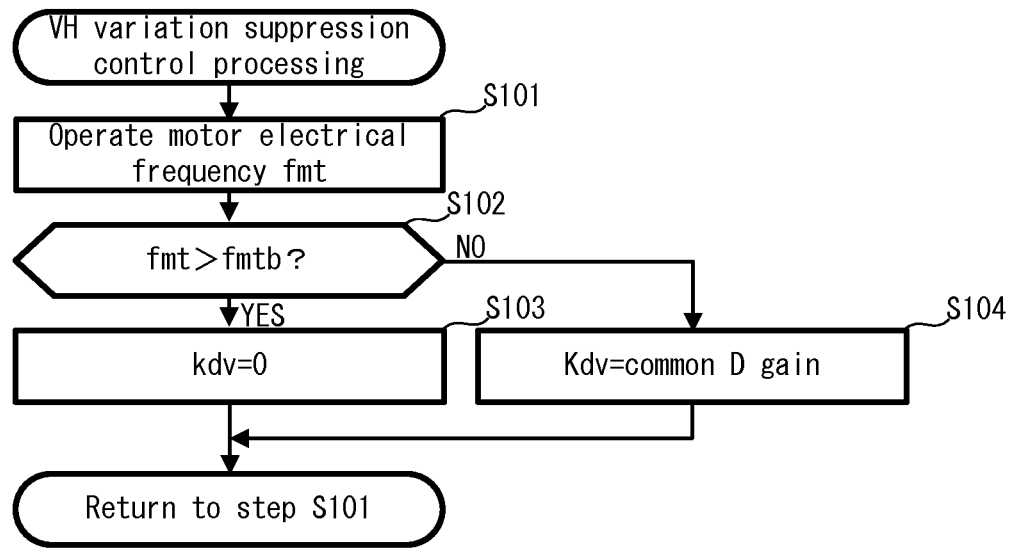
FIG. 8 is a flowchart showing VH variation suppression control processing in a second embodiment of the present invention.

Next, with reference to FIG. 8, an explanation will be given to VH variation suppression control processing performed by the control apparatus 100 as a second embodiment of the present invention. FIG. 8 is a flowchart showing the VH variation suppression control processing. Incidentally, the processing is performed in a drive period of the motor drive system 10, for example, in accordance with a control program stored in the ROM. Incidentally, the system configuration in the second embodiment is assumed to be equivalent to that of the motor drive system 10 in the first embodiment.

In FIG. 8, the control apparatus 100 operates or calculates the motor electrical frequency fmt (step S101). A definition of the motor electrical frequency fmt is as described above. If operating the motor electrical frequency fmt, the control apparatus 100 determines whether or not the operated motor electrical frequency fmt is a value on a higher frequency side than a reference frequency fmtb (step S102).

If the motor electrical frequency fmt is the value on the higher frequency side than the reference frequency fmtb (the step S102: YES), the control apparatus 100 sets the derivative gain kdv of the BPF 113E to zero, via the voltage control operation part 113 (step S 103). The situation in which the derivative gain kdv is zero is namely equivalent to the implementation of the PI control by the voltage control operation part 113 instead of the PID control.

On the other hand, if the motor electrical frequency fmt is less than or equal to the reference frequency fmtb (the step 102: NO), the control apparatus 100 maintains the derivative gain kdv at a common D gain (which is assumed to be the same gain as that in the first embodiment) (step S104). If the setting of the gain is ended, the processing is returned to the step S101. The VH variation suppression control processing is performed as described above.

Figure 9:
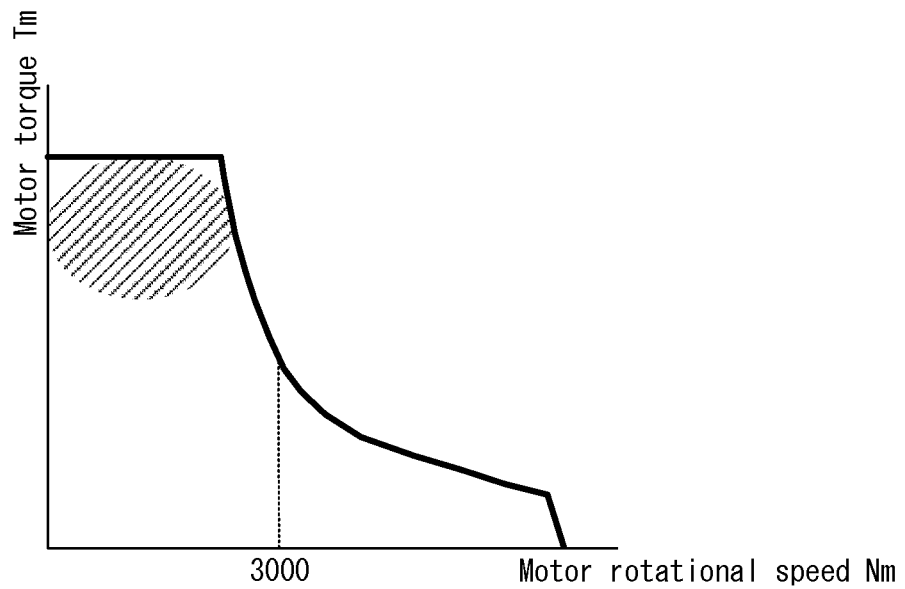
FIG. 9 is a drive characteristic diagram of a three-phase alternating current motor conceptually explaining a reference frequency fmtb associated with the processing in FIG. 8.

Now, with reference to FIG. 9, the reference frequency ftmb will be explained. FIG. 9 is a drive characteristic diagram of the three-phase AC motor M1.

In FIG. 9, the vertical axis indicates motor torque Tm, and the horizontal axis indicates a motor rotational speed Nm.

In the smoothing condenser C, the voltage variation corresponding to the motor electrical frequency depends on the motor electrical frequency fmt if looking only at its frequency characteristic; however, the variation range is also influenced by the motor torque Tm. Specifically, as the motor torque Tm decreases, the variation range associated with the voltage variation tends to decrease, On the other hand, as illustrated by a solid line in the drawing, in the three-phase AC motor M1, an increase in the rotational speed causes a reduction in maximum torque after a certain rotational speed. Therefore, from a practical viewpoint, it is possible to set a reference motor rotational speed in which the necessity of the voltage variation suppression is considered to be low in a rotational speed area which is higher than the reference motor rotational speed, experimentally, experientially, or theoretically in advance. The aforementioned reference frequency fmtb is a frequency corresponding to the reference motor rotational speed.

Further to that, an operating area of the three-phase AC motor M1 in which the voltage variation which significantly needs to be suppressed occurs is a hatched area in FIG. 9. The area is an area on a lower frequency side than 3000 rpm (corresponding to fmt=200 Hz) in FIG. 9.

As described above, according to the VH variation suppression control processing in the second embodiment, if the motor electrical frequency fmt is the value on the higher frequency side than the reference frequency fmtb, which is set to suppress the voltage variation corresponding to the motor electrical frequency in advance, the necessity of the voltage variation suppression is considered to be low, and the control form of the boost converter 200 is changed from the PID control to the PI control. As a result, it is possible to prevent a phenomenon such as oscillation in a phase delay area in which the phase of the BPF 113E is delayed from that of an ideal differentiator while suppressing the voltage variation of the smoothing condenser C without any practical problem.

Incidentally, looking at a relation between the reference frequency fmtb and the cutoff frequency fc of the BPF 113E, the reference frequency fmtb is desirably about ½ to ¼ of the cutoff frequency fc from the viewpoint of ensuring a desired phase lead characteristic. Therefore, if the reference motor rotational speed described above is set in advance, the reference frequency fmtb is set as the motor electrical frequency corresponding to the reference motor rotational speed, and then, the cutoff frequency fc of the BPF 113E can be determined as a frequency value of two to four times the fmtb.

The present invention is not limited to the aforementioned embodiments, but various changes may be made, if desired, without departing from the essence or spirit of the invention which can be read from the claims and the entire specification. A boost converter control apparatus, which involves such changes, is also intended to be within the technical scope of the present invention.

INDUSTRIAL APPLICABILITY

The present invention can be applied to control a boost converter in the drive control of an alternating current motor.

DESCRIPTION OF REFERENCE CODES 10 motor drive system
100 control apparatus
110 boost converter controller
113 voltage control operation part
113E BPF (bandpass filter)
120 inverter controller
200 boost converter
300 inverter
C smoothing condenser
B direct current power supply
M1 three-phase alternating current motor

The invention claimed is:
1. A boost converter control apparatus which is configured to control a boost converter in a motor drive system, said motor drive system comprising:
a direct current power supply;
a three-phase alternating current motor;
an electric power converter disposed between the direct current power supply and the three-phase alternating current motor, the electric power converter including switching circuits, each of which corresponds to respective one of three phases of the three-phase alternating current motor, and a smoothing condenser, which is disposed electrically in parallel with the switching circuits; and
the boost converter disposed between the electric power converter and the direct current power supply, the boost converter boosting a direct current voltage of the direct current power supply and supplying it to the electric power converter, said boost converter control apparatus comprising:

an operating device comprising a proportional element, an integral element and a derivative element, the derivative element being configured as a bandpass filter, said operating device calculating a PID controlled variable corresponding to an electric current command value of the boost converter for maintaining an output voltage of the boost converter at a command value of an inter-terminal voltage VH of the smoothing condenser; and a controlling device which is configured to control the output voltage of the boost converter on the basis of the calculated PID controlled variable, wherein a cutoff frequency of the bandpass filter is greater than or equal to an upper limit value of a motor electrical frequency which is proportional to a rotational speed of the three-phase alternating current motor, and the cutoff frequency is less than a lower limit value of a carrier frequency of the electric power converter.

2. A boost converter control apparatus which is configured to control a boost converter in a motor drive system, said motor drive system comprising:

a direct current power supply;

a three-phase alternating current motor;

an electric power converter disposed between the direct current power supply and the three-phase alternating current motor, the electric power converter including switching circuits, each of which corresponds to respective one of three phases of the three-phase alternating current motor, and a smoothing condenser, which is disposed electrically in parallel with the switching circuits; and the boost converter disposed between the electric power converter and the direct current power supply, the boost converter boosting a direct current voltage of the direct current power supply and supplying it to the electric power converter, said boost converter control apparatus comprising:

an operating device comprising a proportional element, an integral element and a derivative element, the derivative element being configured as a bandpass filter, said operating device calculating a PID controlled variable corresponding to an electric current command value of the boost converter for maintaining an output voltage of the boost converter at a command value of an inter-terminal voltage VH of the smoothing condenser; and a controlling device which is configured to control the output voltage of the boost converter on the basis of the calculated PID controlled variable, wherein said operating device calculates a PI controlled variable in which the derivative element is invalid, instead of the PID controlled variable, if a rotational speed of the three-phase alternating current motor is greater than or equal to a predetermined value, and said controlling device controls the output voltage on the basis of the calculated PI controlled variable.

* * * * *